(12) United States Patent
Yu et al.

(10) Patent No.: US 11,451,258 B2
(45) Date of Patent: Sep. 20, 2022

(54) MOBILE PHONE PROTECTIVE SLEEVE WITH NOVEL WATERPROOF STRUCTURE

(71) Applicants: Yanghua Yu, Yichun (CN); Zhenxiang Liu, Shaoyang (CN)

(72) Inventors: Yanghua Yu, Yichun (CN); Zhenxiang Liu, Shaoyang (CN)

(*) Notice: Subject to any disclaimer, the term of this patent is extended or adjusted under 35 U.S.C. 154(b) by 85 days.

(21) Appl. No.: 17/131,804

(22) Filed: Dec. 23, 2020

(65) Prior Publication Data
US 2021/0119660 A1    Apr. 22, 2021

(51) Int. Cl.
*H04B 1/3888*    (2015.01)
*A45C 11/00*     (2006.01)
*H04M 1/725*     (2021.01)
*A45C 13/00*     (2006.01)
*H04B 1/38*      (2015.01)

(52) U.S. Cl.
CPC ............ *H04B 1/3888* (2013.01); *A45C 11/00* (2013.01); *A45C 13/008* (2013.01); *H04M 1/725* (2013.01); *A45C 2011/002* (2013.01); *H04B 2001/3894* (2013.01)

(58) Field of Classification Search
CPC .......... H04B 1/3888; H04B 2001/3894; A45C 11/00; A45C 13/008; A45C 13/002; A45C 2011/002; H04M 1/725
See application file for complete search history.

(56) References Cited

U.S. PATENT DOCUMENTS 10,291,280 B1 *  5/2019  Deng ................. H04M 1/0202

* cited by examiner

*Primary Examiner* — Keith Ferguson

(57) ABSTRACT

The present disclosure provides a mobile phone protective sleeve with a novel waterproof structure. The mobile phone protective sleeve with the novel waterproof structure comprises a lower cover, an upper cover and a screen protection sheet hermetically connected to the upper cover, wherein the lower cover comprises a base plate and a lower cover mounting sleeve, a sealing groove is formed in the inner wall of the lower cover mounting sleeve circumferentially, the base plate is arranged at the middle part of the lower cover mounting sleeve, and the upper cover comprises an internal part hard rubber frame, an external part hard rubber frame and a soft rubber frame arranged on the outer side of the external part hard rubber frame. The waterproof stability can be effectively guaranteed through the external part hard rubber frame and the internal part hard rubber frame.

10 Claims, 10 Drawing Sheets

MOBILE PHONE PROTECTIVE SLEEVE WITH NOVEL WATERPROOF STRUCTURE

TECHNICAL FIELD

The present disclosure belongs to the technical field of mobile phone accessories, and particularly relates to a mobile phone protective sleeve with a novel waterproof structure.

BACKGROUND

Along with the development of science and technology, more and more occasions for applying mobile phones exist, and more and more requirements of people for mobile phone protective sleeves exist. Since mobile phones are free of a waterproof function, once a mobile phone is immersed in water during use, an internal circuit of the mobile phone is often damaged and the mobile phone cannot be continuously and normally used. Therefore, the use occasions of mobile phones are limited, for example, when underwater shooting is needed.

At present, some mobile phone protective sleeves with the waterproof function exist in the market, but basically depend on waterproof sealing rings to realize waterproofness, the structure is complex, disassembly and assembly procedures are complex, and poor assembly is not easy to find, so that waterproofness failure and poor customer experience are caused when customers use the mobile phone protective sleeves.

SUMMARY

The present disclosure aims to provide a mobile phone protective sleeve with a novel waterproof structure, and aims to solve the problems of tedious disassembly and assembly, low waterproof performance, easy assembly deviation and low reliability in the prior art.

To achieve the purpose, the present disclosure provides the technical scheme that the mobile phone protective sleeve with the novel waterproof structure comprises a lower cover, an upper cover hermetically arranged on the top of the lower cover and a screen protection sheet hermetically connected to the upper cover, the lower cover comprises a base plate and a lower cover mounting sleeve, a sealing groove is formed in the inner wall of the lower cover mounting sleeve circumferentially, the base plate is arranged at the middle part of the lower cover mounting sleeve, the peripheral side of the base plate is embedded into the sealing groove, the upper cover comprises an internal part hard rubber frame, an external part hard rubber frame and a soft rubber frame arranged on the outer side of the external part hard rubber frame in a sleeving mode, the internal part hard rubber frame is matched with the external part hard rubber frame, a mounting, groove is formed in the top of the lower cover mounting sleeve circumferentially, the mounting groove extends outwards to form first sealing surfaces the bottom of the internal part hard rubber frame extends outwards to form second sealing surfaces matched with the first sealing surfaces, and the first sealing surfaces and the second sealing surfaces form the waterproof structure.

For the purpose that the mobile phone protective sleeve with the novel waterproof structure achieves an effect of guaranteeing sealing performance, preferably, the first sealing surfaces and the second sealing surfaces are L-shaped respectively, the first sealing surfaces comprise a first horizontal surface and a first vertical surface, the second sealing surfaces comprise a second horizontal surface and a second vertical surface, the first horizontal surface and the second horizontal surface are oppositely arranged, the first vertical surface and the second vertical surface are oppositely arranged, the bottom of the soft rubber frame abuts against the top of the first horizontal surface, and a barbed part extending in the direction of the first horizontal surface is arranged at the free end of the second horizontal surface.

For the purpose that the mobile phone protective sleeve with the novel waterproof structure achieves the effect that the operation is more convenient, preferably, a sound-dialing key hole is formed, corresponding to the inner walls of the external part hard rubber frame and the internal part hard rubber frame, of the soft rubber frame, and the inner wall of the sound-dialing key hole is provided with a sound-dialing knob assembly hermetically connected with the sound-dialing key hole.

For the purpose that the mobile phone protective sleeve with the novel waterproof structure achieves an effect of guaranteeing waterproof performance, preferably, the sound-dialing knob assembly comprise a knob column, a sound-dialing column and a waterproof sealing ring, the sound-dialing column and the waterproof sealing ring are in plugging fit with the knob column, the inner bottom wall of the knob column is provided with a decorative sheet, a sound-dialing bulge is arranged on one side of the outer surface of the sound-dialing column, the waterproof sealing ring is arranged on the inner wall of the sound-dialing column, an arc-shaped sliding groove is formed in the outer circumferential surface, corresponding, to one side of the sound-dialing key hole, of the soft rubber frame, and a rotating clamping groove extending to the outer surface of the arc-shaped sliding groove is formed in the outer surface of the knob column.

For the purpose that the mobile phone protective sleeve with the novel waterproof structure achieves an effect of improving the waterproof stability, preferably, an annular limiting groove is formed in the inner end of the knob column circumferentially, the outer surface, corresponding to the annular limiting groove, of the external part hard rubber frame is provided with an annular limiting part, and first bulges tightly matched with the knob column are arranged in the inner circumferential direction, close to the sound-dialing key hole, of the soft rubber frame respectively.

For the purpose that the mobile phone protective sleeve with the novel waterproof structure achieves the effect of facilitating assembly, preferably, a charging connecting hole is formed in the outer surface, corresponding to the external part hard rubber frame and the internal part hard rubber frame, of the soft rubber frame, and a charging padding is clamped to the inner wall of the charging connecting hole.

For the purpose that the mobile phone protective sleeve with the novel waterproof structure achieves the effect of improving assembly stability and guaranteeing waterproof performance, preferably, the middle part of the outer surface of the charging padding is circumferentially provided with a step structure from an outer end surface to an inner end surface, the charging connecting hole of the external part hard rubber frame and the internal part hard rubber frame internally and circumferentially abut against a low step of the step structure, and an annular clearance groove is formed in the inner wall of the charging connecting hole.

For the purpose that the mobile phone protective sleeve with the novel waterproof structure achieves the effect of facilitating mounting fixation, preferably, a mounting boss extends inwards in the circumferential direction of the top of the internal part hard rubber frame, and the outer surface of the screen protection sheet is tightly attached to the inner side of the mounting boss.

For the purpose that the mobile phone protective sleeve with the novel waterproof structure achieves the effect of guaranteeing the use safety of a camera, preferably, protective foam is arranged on the inner bottom wall, corresponding to the camera, of the base plate, and a camera window is arranged on the inner wall of the protective foam.

For the purpose that the mobile phone protective sleeve with the novel waterproof structure achieves the effect of guaranteeing tone quality, preferably, an MIC through hole is formed in the outer surface, corresponding to the external part hard rubber frame and the internal part hard rubber frame, of the soft rubber frame, a waterproof film is fixedly attached to the inner wall, close to the MIC through hole, of the internal part hard rubber frame, and MIC hole foam is arranged on the inner wall of the waterproof film.

Compared with the prior art, the present disclosure has the following beneficial effects:

Firstly, according to the mobile phone protective sleeve with the novel waterproof structure, through the arrangement of the internal part hard rubber frame, the external part hard rubber frame and the soft rubber frame, the mobile phone protective sleeve is simple in structure and more convenient to disassemble and assemble, the mobile phone protective sleeve can be disassembled and assembled frequently more effectively, a waterproof effect is not affected, the service time of the mobile phone protective sleeve is prolonged, and the waterproof stability can be effectively guaranteed through the external part hard rubber frame and the internal part hard rubber frame, so that the reliability in use is improved.

Secondly, according to the mobile phone protective sleeve with the novel waterproof structure, through the arrangement of the lower cover mounting sleeve, the upper cover, the lower cover, the first sealing surfaces and the second sealing surfaces, after the upper cover and the lower cover are assembled, the first sealing surfaces and the second sealing surfaces are in interference fit to achieve the waterproof effect, and the barbed part is arranged at the free end of the second horizontal surface of the second sealing surfaces, so that a clearance position is reserved between the first horizontal surface and the second horizontal surface after assembly, and the situation that the lower cover mounting sleeve cannot be assembled in place due to interference fit is prevented; and after the clearance position is assembled, the lower cover mounting sleeve naturally forms a barb due to interference fit, so that a waterproof function is more stable, whether the upper cover and the lower cover are assembled in place or not can be visually seen (a local glue position protrusion of the lower cover can be seen at the place where the upper cover and the lower cover are not assembled in place), and waterproof failure caused by improper assembly of the upper cover and the lower cover is avoided.

Thirdly, according to the mobile phone protective sleeve with the novel waterproof structure, through the arrangement of the sound-dialing knob assembly, the waterproof sealing ring, the decorative sheet, the charging connecting hole and the charging padding, the sound-dialing knob assembly, the charging padding and the upper cover are tightly matched, the structure is stable, the use safety can be effectively guaranteed through the charging connecting hole, the safety and reliability are higher, the waterproof sealing performance can be effectively improved through the water-proof sealing ring, the overall attractiveness is improved through the decorative sheet, and the use effect is improved.

BRIEF DESCRIPTION OF THE DRAWINGS

The accompanying drawings serve to provide further understanding of the present disclosure and constitute a part of the specification, together with embodiments of the present disclosure, serve to explain the present disclosure and do not constitute limitation of the present disclosure. In the accompanying drawings.

Reference signs: 1, lower cover; 2, upper cover; 3, screen protection sheet; 4, base plate; 5, lower cover mounting sleeve; 6, internal part hard rubber frame; 7, external part hard rubber frame; 8, soft rubber frame; 9, first sealing surface; 10, second sealing surface; 11, sound-dialing key hole; 12, sound-dialing knob assembly; 13, knob column; 14, sound-dialing column; 15, waterproof sealing ring; 16, decorative sheet; 17, sound-dialing bulge; 18, arc-shaped sliding groove; 19, rotating clamping groove; 20, annular limiting groove; 21, annular limiting part; 22, first bulge; 23, charging connecting hole; 24, charging padding; 25, annular clearance groove; 26, mounting boss; 27, protective foam; 28, camera window; 29, MIC through hole; 30, waterproof film; and 31, MIC hole foam.

DESCRIPTION OF THE EMBODIMENTS

The technical schemes according to embodiments of the present disclosure are clearly and completely described in the following with reference to the accompanying drawings in the present disclosure. Apparently, the embodiments in the following description are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

Embodiment

Figure 1:
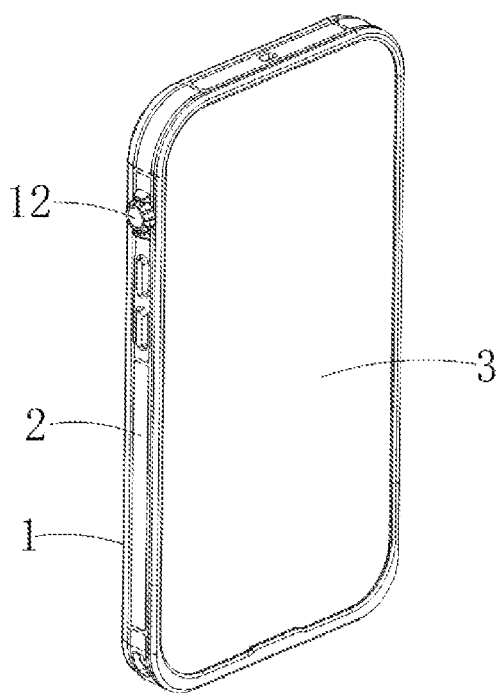
FIG. 1 is a front schematic structural diagram in the present disclosure.
Figure 2:
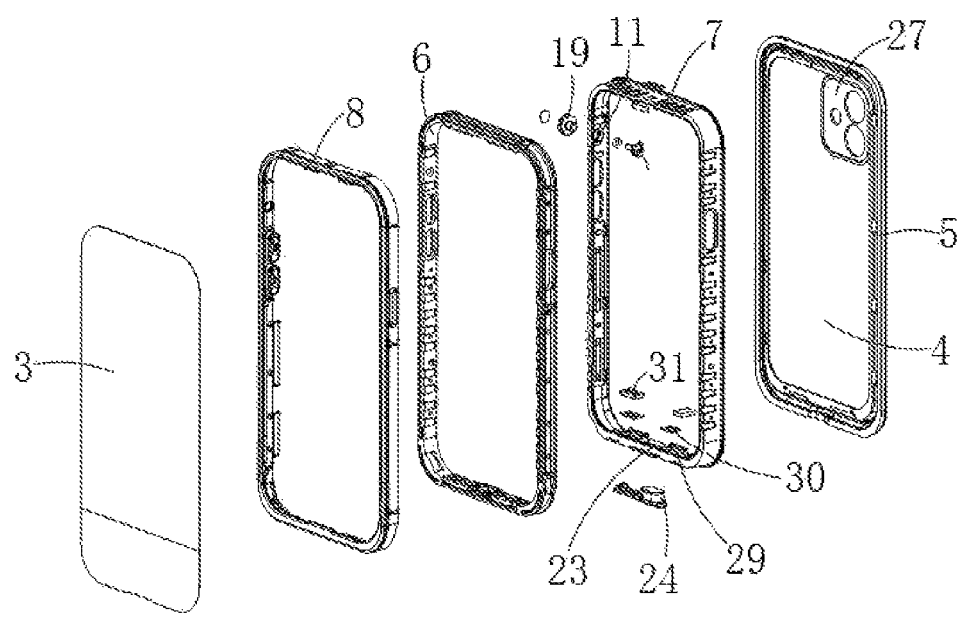
FIG. 2 is an exploded schematic structural diagram in the present disclosure.
Figure 3:
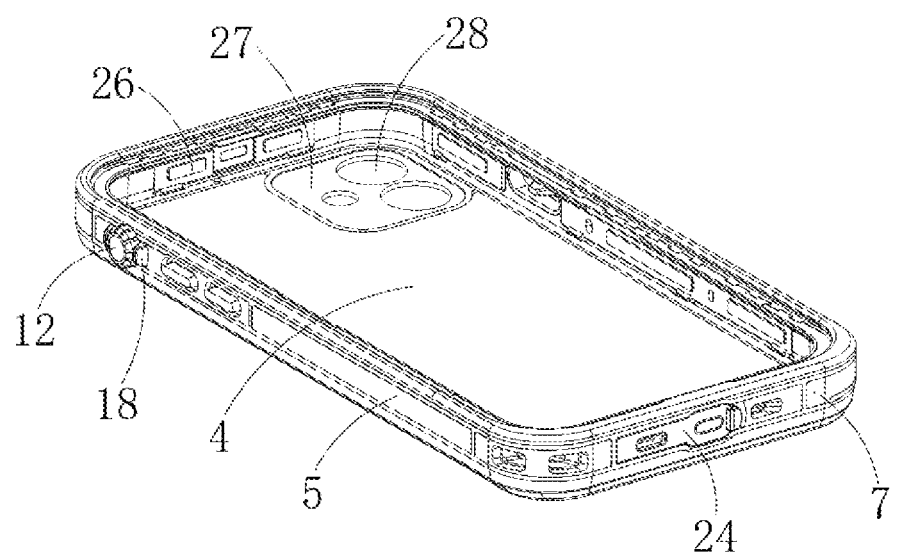
FIG. 3 is an internal schematic structural diagram in the present disclosure.
Figure 4:
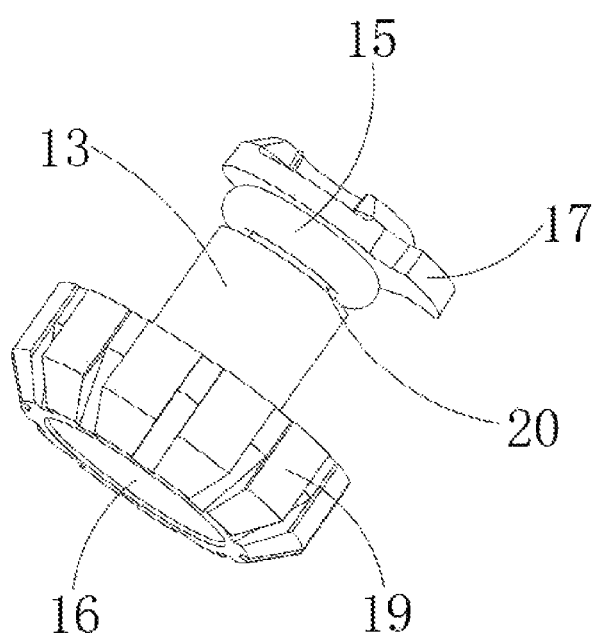
FIG. 4 is a schematic structural diagram of a sound-dialing knob assembly in the present disclosure.
Figure 5:
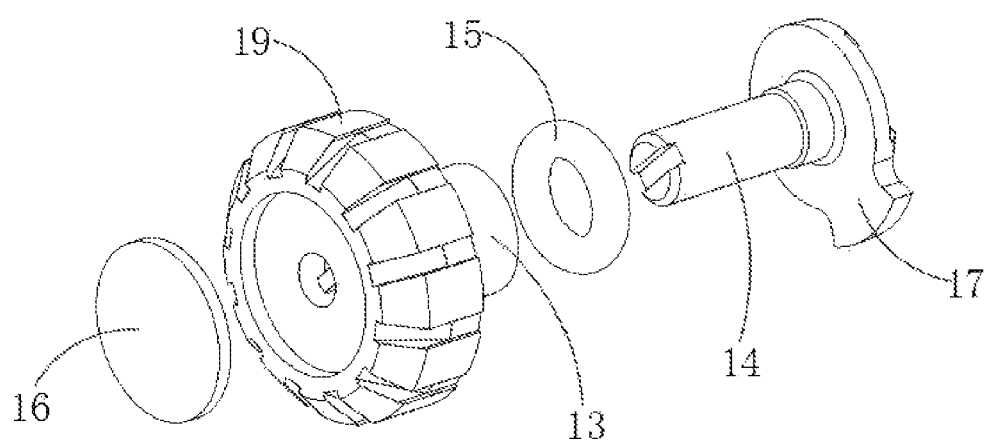
FIG. 5 is an exploded schematic structural diagram of a sound-dialing knob assembly in the present disclosure.
Figure 6:
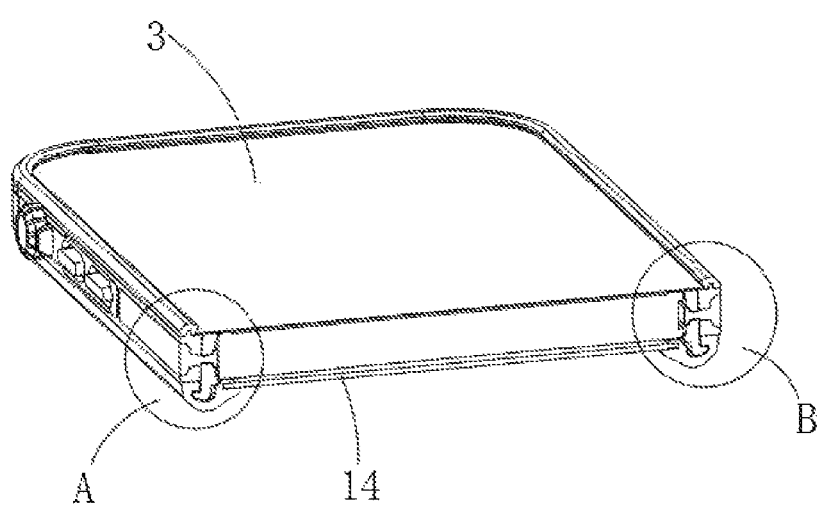
FIG. 6 is a first perspective section view schematic structural diagram in the present disclosure.
Figure 7:
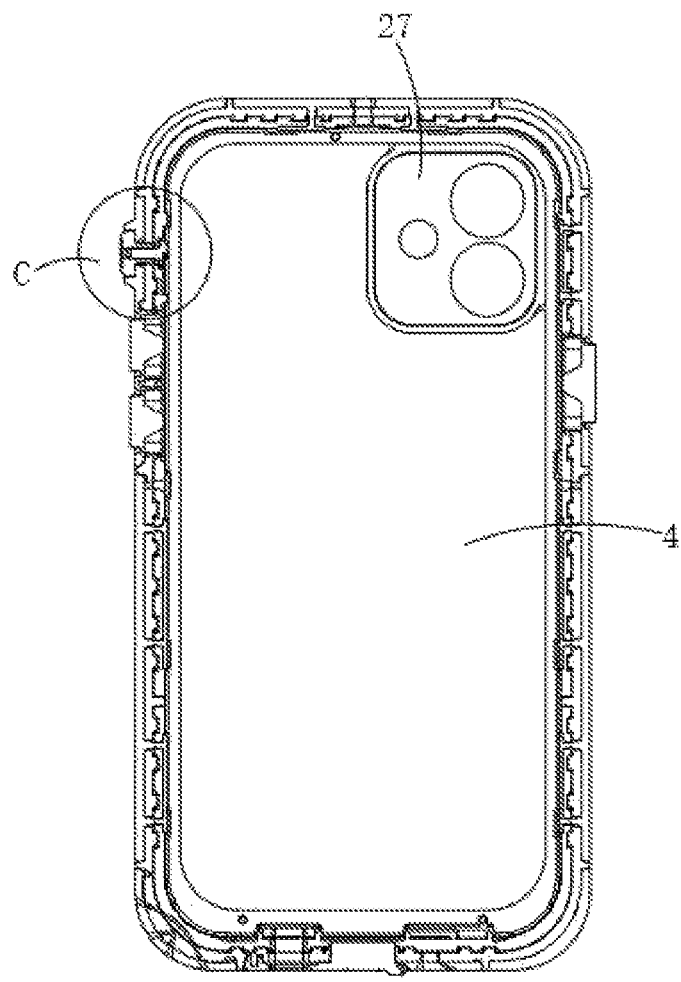
FIG. 7 is a second perspective section view schematic structural diagram in the present disclosure.
Figure 8:
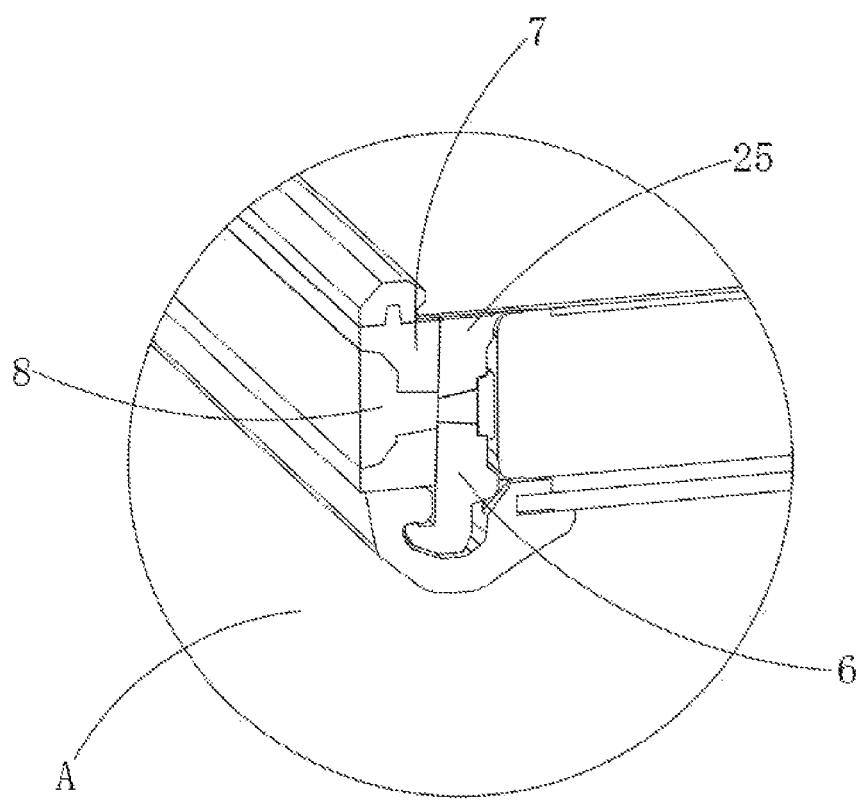
FIG. 8 is a partial enlarged schematic structural diagram of part A in FIG. 6 in the present disclosure.
Figure 9:
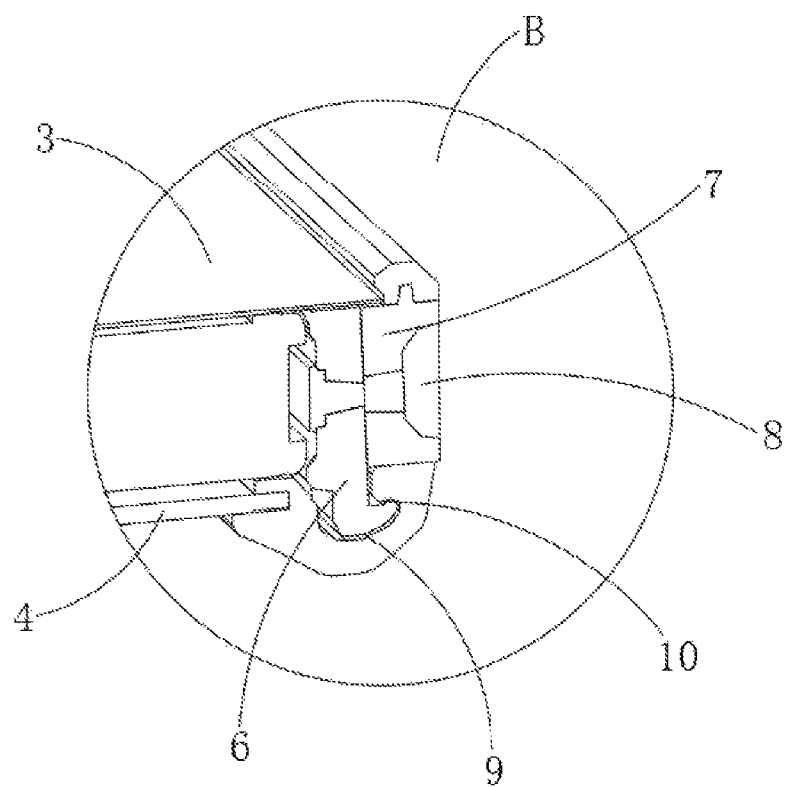
FIG. 9 is a partial enlarged schematic structural diagram of part B in FIG. 6 in the present disclosure.
Figure 10:
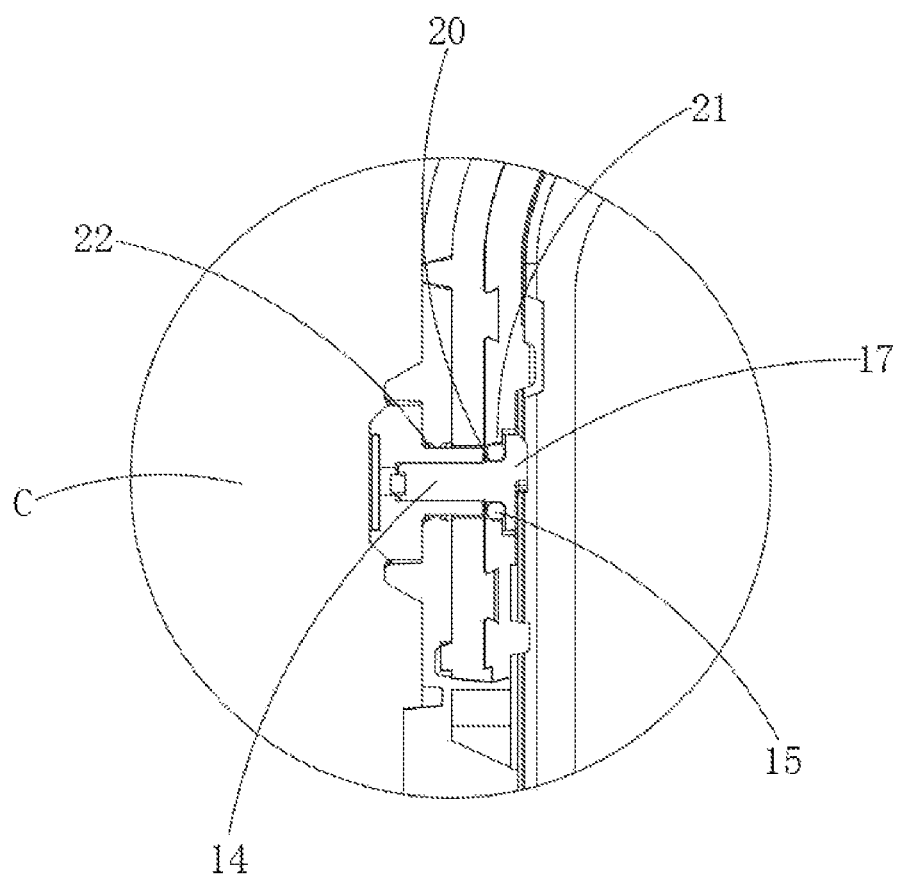
FIG. 10 is a partial enlarged schematic structural diagram of part C in FIG. 7 in the present disclosure.

Referring to FIG. 1 to FIG. 10, the present disclosure provides the technical scheme that a mobile phone protective sleeve with a novel waterproof structure comprises a lower cover 1, an upper cover 2 hermetically arranged on the top of the lower cover and a screen protection sheet 3 hermetically connected to the upper cover, the lower cover 1 comprises a base plate 4 and a lower cover mounting sleeve 5, a sealing groove is formed in the inner wall of the lower cover mounting sleeve 5 circumferentially, the base plate 4 is arranged at the middle part of the lower cover mounting sleeve 5, the peripheral side of the base plate is embedded into the sealing groove, the upper cover 2 comprises an internal part hard rubber frame 6, an external part hard rubber frame 7 and a soft rubber frame 8 arranged on the outer side of the external part hard rubber frame 7 in a sleeving mode, the internal part hard rubber frame 6 is matched with the external part hard rubber frame 7, a mounting groove is formed in the top of the lower cover mounting sleeve 5 circumferentially, the mounting groove extends outwards to form first sealing surfaces 9, the bottom of the internal part hard rubber frame 6 extends outwards to form second sealing surfaces 10 matched with the first sealing surfaces 9, and the first sealing surfaces 9 and the second sealing surfaces 10 form the waterproof structure.

In the specific embodiment of the present disclosure, in the use process of the mobile phone protective sleeve, through the arrangement of the lower cover 1 and the upper cover 2, after the upper cover 2 and the lower cover 1 are assembled, whether the upper cover and the lower cover are assembled in place or not can be visually seen (a local glue position protrusion of the lower cover can be seen at the place where the upper cover and the lower cover are not assembled in place), and waterproof failure caused by improper assembly of the upper cover 2 and the lower cover 1 is avoided; through the arrangement of the screen protection sheet 3, the use safety of a mobile phone screen can be effectively guaranteed through the screen protection sheet 3, meanwhile, the waterproof performance is improved, through the arrangement of the base plate 4 and the lower cover mounting sleeve 5, due to interference fit, the lower cover mounting sleeve 5 naturally forms a barb, the mobile phone screen is more stable through the base plate 4, and a waterproof function is guaranteed; through the arrangement of the internal part hard rubber frame 6 and the external part hard rubber frame 7, the waterproof stability can be effectively guaranteed, and the use reliability is improved; and through the arrangement of the soft rubber frame 8, the use protection performance can be effectively improved, and the mobile phone protective sleeve is safer to use.

Specifically, the first sealing surfaces 9 and the second sealing surfaces 10 are L-shaped respectively, the first sealing surfaces 9 comprise a first horizontal surface and a first vertical surface, the second sealing surfaces 10 comprise a second horizontal surface and a second vertical surface, the first horizontal surface and the second horizontal surface are oppositely arranged, the first vertical surface and the second vertical surface are oppositely arranged, the bottom of the soft rubber frame 8 abuts against the top of the first horizontal surface, and a barbed part extending in the direction of the first horizontal surface is arranged at the free end of the second horizontal surface.

In the embodiment, the first sealing surfaces 9 of the lower cover mounting sleeve 5 and the second sealing surfaces 10 of the external part hard rubber frame 7 are designed to be in interference fit so as to achieve a waterproof effect, and the barbed part is arranged at the free end of the second horizontal surface of the second sealing surfaces 10, so that a clearance position is reserved between the first horizontal surface and the second horizontal surface after assembly, and the situation that the lower cover mounting sleeve 5 cannot be assembled in place due to interference fit is prevented; and after the clearance position is assembled, the lower cover mounting sleeve 5 naturally forms a barb due to interference fit, so that a waterproof function is more stable, a local glue position protrusion of the lower cover 1 can be seen at the place where the upper cover and the lower cover are not assembled in place, so that whether the upper cover and the lower cover are assembled in place or not can be visually seen.

Specifically, a sound-dialing key hole 11 is formed, corresponding to the inner walls of the external part hard rubber frame 7 and the internal part hard rubber frame 6, of the soft rubber frame 8, and the inner wall of the sound-dialing key hole 11 is provided with a sound-dialing knob assembly 12 hermetically connected with the sound-dialing key hole. The sound-dialing knob assembly 12 comprise a knob column 13, a sound-dialing column 14 and a waterproof sealing ring 15, the sound-dialing column 14 and the waterproof sealing ring 15 are in plugging fit with the knob column 13, the inner bottom wall of the knob column 13 is provided with a decorative sheet 16, a sound-dialing bulge 17 is arranged on one side of the outer surface of the sound-dialing column 14, the waterproof sealing ring 15 is arranged on the inner wall of the sound-dialing column 14, an arc-shaped sliding groove 18 is formed in the outer circumferential surface, corresponding to one side of the sound-dialing key hole 11, of the soft rubber frame 8, and a rotating clamping groove 19 extending to the outer surface of the arc-shaped sliding groove 18 is formed in the outer surface of the knob column 13.

In the embodiment, the knob column 13 and the sound-dialing column 14 are both made of high-strength PC materials, the sound-dialing key hole 11 is arranged to be a round hole, the knob column 13 is in plugging fit with the sound-dialing column 14, the knob column 13 and the sound-dialing column 14 are fixed in a dispensing mode, the sound dialing bulge 17 is used for abutting against the upper side and the lower side of a mobile phone mute key respectively, and the rotating clamping groove 19 of the knob column 13 can rotate in the arc-shaped sliding groove 18 of the soft rubber frame 8 so as to drive the sound-dialing bulge 17 of the sound-dialing column 14 to dial a mute key of the mobile phone.

Specifically, an annular limiting groove 20 is formed in the inner end of the knob column 13 circumferentially, the outer surface, corresponding to the annular limiting groove 20, of the external part hard rubber frame 7 is provided with an annular limiting part 21, and first bulges 22 tightly matched with the knob column 13 are arranged in the inner circumferential direction, close to the sound-dialing key hole 11, of the soft rubber frame 8 respectively.

In the embodiment, the annular limiting part 21 is matched with the annular limiting groove 20 to limit the position of the sound-dialing knob assembly 12, the first bulge 22 of the soft rubber frame 8 interferes with the outer circumference of the knob column 13, and therefore the waterproof effect is achieved.

Specifically, a charging connecting hole 23 is formed in the outer surface, corresponding to the external part hard rubber frame 7 and the internal part hard rubber frame 6, of the soft rubber frame 8, and a charging padding 24 is clamped to the inner wall of the charging connecting hole 23. The middle part of the outer surface of the charging padding 24 is circumferentially provided with a step structure from an outer end surface to an inner end surface, the charging connecting hole 23 of the external part hard rubber frame 7 and the internal part hard rubber frame 6 internally and circumferentially abut against a low step of the step structure, and an annular clearance groove 25 is formed in the inner wall of the charging connecting hole 23.

In the embodiment, the charging padding 24 is made of a high-elasticity TPU material, interference is designed on the periphery of the charging padding 24, and after assembly, the barb is naturally formed at the position of the annular receding groove 25, so that the charging padding 24 is stably assembled.

Specifically, a mounting boss 26 extends inwards in the circumferential direction of the top of the internal part hard rubber frame 6, and the outer surface of the screen protection sheet 3 is tightly attached to the inner side of the mounting boss 26.

In the embodiment, the screen protection sheet 3 is made of a wear-resistant/high-transmittance PET material, and the screen protection sheet 3 and the mounting boss 26 of the external part hard rubber frame 7 are fixedly attached through glue, in the following specific steps, hot melting glue is applied to the circumferential plane of the inner side surface of the mounting boss 26 of the external part hard rubber frame 7, and the screen protection sheet 3 is pressed through a jig, the hot melting glue is uniformly pressed, a laminated product is placed on the plane, and the laminated product is naturally placed until the laminated product is firmly laminated.

Specifically, protective foam 27 is arranged on the inner bottom wall, corresponding to the camera, of the base plate 4, and a camera window 28 is arranged on the inner wall of the protective foam 27.

In the embodiment, the camera protective foam 27 is made of a high-elasticity/wear-resistant/high-density foam material, so that the use safety of the camera can be effectively guaranteed.

Specifically, an MIC through hole 29 is formed in the outer surface, corresponding to the external part hard rubber frame 7 and the internal part hard rubber frame 6, of the soft rubber frame 8, a waterproof film 30 is fixedly attached to the inner wall, close to the MIC through hole 29, of the internal part hard rubber frame 6, and MIC hole foam 31 is arranged on the inner wall of the waterproof film 30.

In the embodiment, the waterproof film 30 is made of a waterproof/breathable/sound-transmitting/back-adhesive material, the waterproof film 30 is attached to the MIC through hole 29 of the internal part hard rubber frame 6 to achieve waterproofness, and the MIC hole foam 31 is made of a high-elasticity/wear-resistant/high-density/back-adhesive foam material, so that the sealed cavity is formed in the MIC through hole 29, and the tone quality is guaranteed during mobile phone communication.

In the working principle and use flow of the present disclosure, when the mobile phone protective sleeve with the novel waterproof structure is used, a mobile phone is clamped in the lower cover 1, so that the mobile phone can be stably placed, the disassembly and assembly are more convenient, the mobile phone protective sleeve can be more effectively and frequently disassembled and assembled without affecting the waterproof effect, the service time of the mobile phone protective sleeve is prolonged, the waterproof stability can be effectively guaranteed through the external part hard rubber frame 7 and the internal part hard rubber frame 6, the use reliability is improved, and the mobile phone protective sleeve is safer to use. After the upper cover 2 and the lower cover 1 are assembled, the first sealing surfaces 9 and the second sealing surfaces 10 are in interference fit so as to achieve a waterproof effect, and the barbed part is arranged at the free end of the second horizontal surface of the second sealing surfaces 10, so that a clearance position is reserved between the first horizontal surface and the second horizontal surface after assembly, and the situation that the lower cover mounting sleeve 5 cannot be assembled in place due to interference fit is prevented; and after the clearance position is assembled, the lower cover mounting sleeve 5 naturally forms a barb due to interference fit, so that a waterproof function is more stable, whether the upper cover and the lower cover are assembled in place or not can be visually seen (a local glue position protrusion of the lower cover 1 can be seen at the place where the upper cover and the lower cover are not assembled in place), and waterproof failure caused by improper assembly of the upper cover 2 and the lower cover 1 is avoided. The sound-dialing knob assembly 12, the charging padding 24 and the upper cover 2 are tightly matched, the structure is stable, the use safety can be effectively guaranteed through the charging connecting hole 23, the waterproof sealing performance can be effectively improved through the waterproof sealing ring 15, the overall attractiveness is improved through the decorative sheet 16, and the use effect is improved. The rotating clamping groove 19 of the knob column 13 can rotate in the arc-shaped sliding groove 18 of the soft rubber frame 8 so as to drive the sound-dialing bulge 17 of the sound-dialing column 14 to dial the mute key of the mobile phone. The waterproof film 30 is made of the waterproof/breathable/sound-transmitting/back-adhesive material, the waterproof film 30 is attached to the MIC through hole 29 of the internal part hard rubber frame 6 to achieve waterproofness, and the MIC hole foam 31 is made of the high-elasticity/wear-resistant/high-density/back-adhesive foam material, so that the sealed cavity is formed in the MIC through hole 29, and the tone quality is guaranteed during mobile phone communication.

Finally, it should be noted that the above description is merely a preferred example of the present disclosure and is not intended to limit the present disclosure. Although the present disclosure is described in detail with reference to the foregoing embodiments, those skilled in the art should understand that they may still make modifications to the technical schemes described in the foregoing embodiments or make equivalent replacements to some technical features thereof. Any modification, equivalent replacement, or improvement made without departing from the spirit and principle of the present disclosure shall fall within the protection scope of the present disclosure.

What is claimed is:

1. A mobile phone protective sleeve with a novel waterproof structure, comprising a lower cover (1), an upper cover (2) hermetically arranged on the top of the lower cover and a screen protection sheet (3) hermetically connected to the upper cover, characterized in that the lower cover (1) comprises a base plate (4) and a lower cover mounting sleeve (5), a sealing groove is formed in the inner wall of the lower cover mounting sleeve (5) circumferentially, the base plate (4) is arranged at the middle part of the lower cover mounting sleeve (5), the peripheral side of the base plate (4) is embedded into the sealing groove, the upper cover (2) comprises an internal part hard rubber frame (6), an external part hard rubber frame (7) and a soft rubber frame (8) arranged on the outer side of the external part hard rubber frame (7) in a sleeving mode, the internal part hard rubber frame (6) is matched with the external part hard rubber frame (7), a mounting groove is formed in the top of the lower cover mounting sleeve (5) circumferentially, the mounting groove extends outwards to form first sealing surfaces (9), the bottom of the internal part hard rubber frame (6) extends outwards to form second sealing surfaces (10) matched with the first sealing surfaces (9), and the first sealing surfaces (9) and the second sealing surfaces (10) form the waterproof structure.

2. The mobile phone protective sleeve with the novel waterproof structure according to claim 1, characterized in that the first sealing surfaces (9) and the second sealing surfaces (10) are L-shaped respectively, the first sealing surfaces (9) comprise a first horizontal surface and a first vertical surface, the second sealing surfaces (10) comprise a second horizontal surface and a second vertical surface, the first horizontal surface and the second horizontal surface are oppositely arranged, the first vertical surface and the second vertical surface are oppositely arranged, the bottom of the soft rubber frame (8) abuts against the top of the first horizontal surface, and a barbed part extending in the direction of the first horizontal surface is arranged at the free end of the second horizontal surface.

3. The mobile phone protective sleeve with the novel waterproof structure according to claim 1, characterized in that a sound-dialing key hole (11) is formed in the inner wall, corresponding to the external part hard rubber frame (7) and the internal part hard rubber frame (6), of the soft rubber frame (8), and the inner wall of the sound-dialing key hole (11) is provided with a sound-dialing knob assembly (12) hermetically connected with the sound-dialing key hole (11).

4. The mobile phone protective sleeve with the novel waterproof structure according to claim 3, characterized in that the sound-dialing knob assembly (12) comprise a knob column (13), a sound-dialing column (14) and a waterproof sealing ring (15), the sound-dialing column (14) and the waterproof sealing ring (15) are in plugging fit with the knob column (13), the inner bottom wall of the knob column (13) is provided with a decorative sheet (16), a sound-dialing bulge (17) is arranged on one side of the outer surface of the sound-dialing column (14), the waterproof sealing ring (15) is arranged on the inner wall of the sound-dialing column (14), an arc-shaped sliding groove (18) is formed in the outer circumferential surface, corresponding to one side of the sound-dialing key hole (11), of the soft rubber frame (8), and a rotating clamping groove (19) extending to the outer surface of the arc-shaped sliding groove (18) is formed in the outer surface of the knob column (13).

5. The mobile phone protective sleeve with the novel waterproof structure according to claim 4, characterized in that an annular limiting groove (20) is formed in the inner end of the knob column (13) circumferentially, the outer surface, corresponding to the annular limiting groove (20), of the external part hard rubber frame (7) is provided with an annular limiting part (21), and first bulges (22) tightly matched with the knob column (13) are arranged in the inner circumferential direction, close to the sound-dialing key hole (11), of the soft rubber frame (8) respectively.

6. The mobile phone protective sleeve with the novel waterproof structure according to claim 1, characterized in that a charging connecting hole (23) is formed in the outer surface, corresponding to the external part hard rubber frame (7) and the internal part hard rubber frame (6), of the soft rubber frame (8), and a charging padding (24) is clamped to the inner wall of the charging connecting hole (23).

7. The mobile phone protective sleeve with the novel waterproof structure according to claim 6, characterized in that the middle part of the outer surface of the charging padding (24) is circumferentially provided with a step structure from an outer end surface to an inner end surface, and the charging connecting hole (23) of the external part hard rubber frame (7) and the internal part hard rubber frame (6) internally and circumferentially abut against a low step of the step structure, and an annular clearance groove (25) is formed in the inner wall of the charging connecting hole (23).

8. The mobile phone protective sleeve with the novel waterproof structure according to claim 1, characterized in that a mounting boss (26) extends inwards in the circumferential direction of the top of the internal part hard rubber frame (6), and the outer surface of the screen protection sheet (3) is tightly attached to the inner side of the mounting boss (26).

9. The mobile phone protective sleeve with the novel waterproof structure according to claim 1, characterized in that protective foam (27) is arranged on the inner bottom wall, corresponding to a camera, of the base plate (4), and a camera window (28) is arranged on the inner wall of the protective foam (27).

10. The mobile phone protective sleeve with the novel waterproof structure according to claim 1, characterized in that an MIC through hole (29) is formed in the outer surface, corresponding to the external part hard rubber frame (7) and the internal part hard rubber frame (6), of the soft rubber frame (8), a waterproof film (30) is fixedly attached to the inner wall, close to the MIC through hole (29), of the internal part hard rubber frame (6), and MIC hole foam (31) is arranged on the inner wall of the waterproof film (30).

* * * * *